(12) United States Patent
Pophali et al.

(10) Patent No.: US 7,637,379 B2
(45) Date of Patent: Dec. 29, 2009

(54) CIRCULAR SECONDARY CLARIFIER FOR WASTEWATER TREATMENT AND AN IMPROVED SOLIDS-LIQUID SEPARATION PROCESS THEREOF

(75) Inventors: Girish Ramesh Pophali, Nagpur (IN); Tapas Nandy, Nagpur (IN); Santosh Narain Kaul, Nagpur (IN); Sukumar Devotta, Nagpur (IN)

(73) Assignee: Council of Scientific & Industrial Research (IN)

( * ) Notice: Subject to any disclaimer, the term of this patent is extended or adjusted under 35 U.S.C. 154(b) by 51 days.

(21) Appl. No.: 11/935,525

(22) Filed: Nov. 6, 2007

(65) Prior Publication Data

US 2008/0135473 A1    Jun. 12, 2008

(30) Foreign Application Priority Data

Dec. 7, 2006   (IN) .................. 2623/DEL/2006

(51) Int. Cl.
  *B01D 21/06* (2006.01)
  *B01D 21/24* (2006.01)
(52) U.S. Cl. .................. 210/519; 210/528; 210/530
(58) Field of Classification Search ................. 210/519, 210/525, 528, 530, 540
  See application file for complete search history.

(56) References Cited

U.S. PATENT DOCUMENTS

| | | | | |
|---|---|---|---|---|
| 2,078,266 A | * | 4/1937 | Morehead | 210/525 |
| 2,098,467 A | * | 11/1937 | Sayers et al. | 210/519 |
| 2,197,725 A | * | 4/1940 | Hunter | 210/530 |
| 2,236,128 A | * | 3/1941 | Poole | 210/530 |
| 2,649,412 A | * | 8/1953 | Kivari et al. | 210/530 |
| 2,880,877 A | * | 4/1959 | Sambraus | 210/530 |
| 2,980,934 A | * | 4/1961 | Steindorf | 210/528 |
| 3,353,676 A | * | 11/1967 | Hirsch | 210/519 |
| 3,353,683 A | * | 11/1967 | Geiger | 210/530 |
| 3,589,519 A | * | 6/1971 | Bendel | 210/530 |
| 3,926,805 A | * | 12/1975 | Walker | 210/519 |
| 4,005,019 A | | 1/1977 | Parlette | |
| 4,761,239 A | | 8/1988 | Wardell | |
| 5,306,422 A | | 4/1994 | Krofta | |
| 5,422,006 A | * | 6/1995 | Huber | 210/528 |
| 5,422,017 A | * | 6/1995 | Felder et al. | 210/519 |
| 5,961,826 A | | 10/1999 | Kim | |
| 6,099,743 A | | 8/2000 | Pedersen | |

OTHER PUBLICATIONS

Clarifier Design Manual of Practice, FD-8, WPCF, (1985, 2005); p. 401.
Clarifier Design Manual of Practice, FD-8, WPCF, (1985, 2005); pp. 51-52.
Wastewater Engineering, Treatment and Reuse, IV edition (2003), Metcalf & Eddy inc. 3 pages.
Wastewater Engineering, Treatment and Reuse, IV edition (2003), Metcalf & Eddy inc. pp. 838-839.

* cited by examiner

*Primary Examiner*—Christopher Upton
(74) *Attorney, Agent, or Firm*—St. Onge Steward Johnston & Reens LLC

(57) ABSTRACT

The improved circular secondary clarifier of the present invention requires less surface area and low HRT and provides efficient solids-liquid separation. The improved clarifier has better SS and BOD reduction and provides high under flow solids concentrations, as compared to conventional secondary clarifiers. The improved clarifier is even capable of treating wastewaters containing low MLSS concentration. One of the biggest advantages of improved clarifier is that it does not require a separate sump cum pump house as it removes the settled sludge using suction mechanism thereby reduces capital and recurring cost. Further, it provides natural flocculation, which is essential for agglomeration of solids and increases particle size referred to as 'floc' and eliminates provision for a separate flocculation facility thereby reduces capital and recurring costs.

5 Claims, 5 Drawing Sheets

CIRCULAR SECONDARY CLARIFIER FOR WASTEWATER TREATMENT AND AN IMPROVED SOLIDS-LIQUID SEPARATION PROCESS THEREOF

FIELD OF INVENTION

The present invention relates to "An Improved Circular Secondary Clarifier for Wastewater Treatment and an Improved Solids-liquid Separation Process Thereof". The improved circular secondary clarifier of the present invention enables treatment of wastewaters having suspended solids (SS) concentration in the range 500-5000 mg/l and above, and provides improved solids-liquid separation and enhanced biochemical oxygen demand (BOD) reduction with reduced surface area and low hydraulic retention time (HRT). The improved circular secondary clarifier capable of removing up to 99% of SS also ensures, high under flow solids concentration in the range 15000-17000 mg/l, to be returned to aeration tank using sludge removal suction mechanism. The improved circular secondary clarifier also increases particle size referred to as 'floc' through natural flocculation and does not require separate flocculation facility.

BACKGROUND AND PRIOR ART

Figure 1:
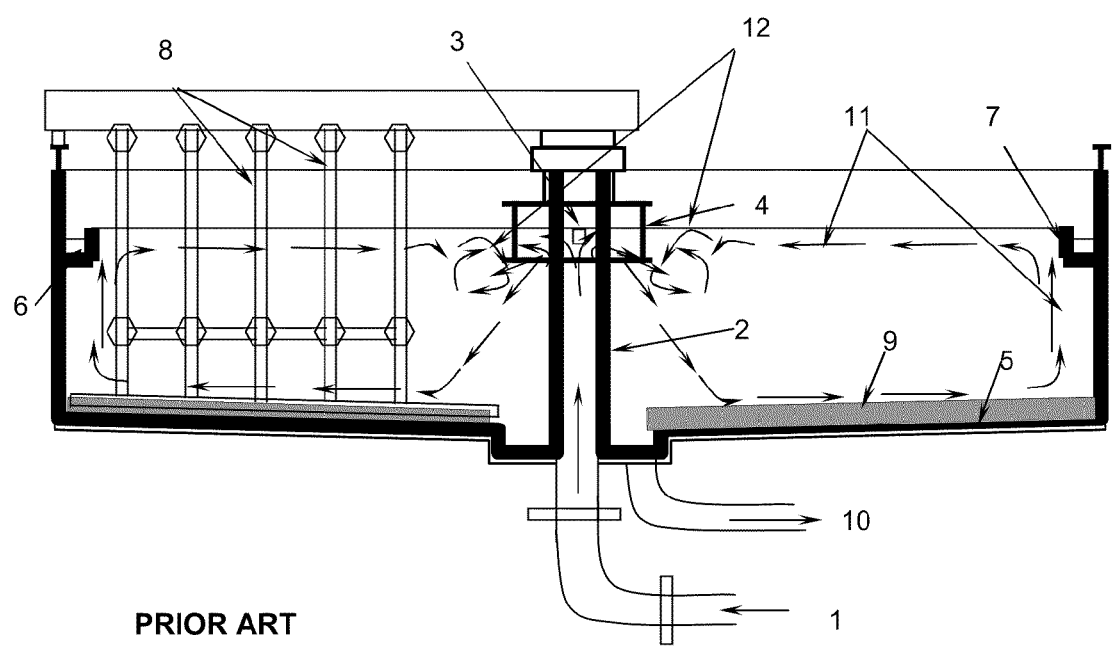

A conventional circular secondary clarifier for treatment of wastewaters as depicted in FIG. 1, comprises an inlet (1) for conveying wastewater, a centre feed column (2) having openings (3) through which, wastewater is radially distributed in to the clarifier, an inlet well also referred to as baffle wall (4) is provided to prevent escape of solids along with the treated effluents, the clarifier bottom (5), having a slope preferably in the range 1 in 12 to 1 in 10, towards the center of clarifier, is provided to collect the settled solids referred to as sludge (9) to the center and the treated effluent (6) is collected into the peripheral channel called launder (7), the settled sludge (9) is collected at the center by a rotating scraper (8) and the sludge (9) is withdrawn under hydrostatic pressure from the bottom outlet (10) and collected in sump cum pump house (not shown) for either recycling to aeration tank or for sludge dewatering and thickening, before ultimate disposal. In the conventional clarifier, wastewater containing mixed liquor suspended solid (MLSS) enters the clarifier, through a high level inlet (3), which creates turbulence in the clarification zone and affects the settling of solids. Since the difference in the density of biological solids and wastewater is very less, the solids remain in suspension, and are carried away along with the outgoing wastewater, thereby deteriorating the treated effluent quality. This in turn affects the thickening of solids and reduces the underflow solids concentration.

The design of secondary clarifier is primarily based on solids loading rate (SLR) and surface overflow rate (SOR) usually expressed in $kg/m^2.d$ and $m^3/m^2.d$, respectively. The surface area of clarifier, for a given solids concentration (expressed in mg/l) and flow rate (expressed in $m^3/d$) is governed by above-referred parameters (SLR, SOR), and the greater of the two is provided.

Reference may be made to Wastewater Engineering, Treatment and Reuse IV edition (2003), Metcalf & Eddy Inc., wherein the average SLR and SOR for clarifier following extended aeration unit, range from 1 to 5 $kg/m^2.hr$ (24 to 120 $kg/m^2.d$) and 8 to 16 $m^3/m^2.d$, respectively, and the depth of clarifier varies from 3.5-6 m. Under these conditions, for a conventional clarifier, the surface area required for a given flow rate is more as compared to the improved clarifier, described in the present invention. Further, the recommended depth of conventional clarifier is also on the higher side, as compared to the improved clarifier described in the present invention. In other words, the design parameters for a clarifier, viz. SLR and SOR, can be reset to higher ranges to obtain a compact clarifier, which is capable of providing improved solids-liquid separation. However, in the conventional clarifiers it is not feasible to provide higher ranges for design parameters (SLR, SOR) due to the problem of effective solids-liquid separation.

Reference may be made to "Clarifier Design Manual of Practice, FD-8, WPCF, (1985, 2005)", wherein the various conventional circular secondary clarifiers comprising center and peripheral feed arrangements with flow patterns are shown. In the clarifiers with central feed arrangement, the diameter of feed well is about 20-25% of the diameter of the clarifier, which in turn reduces the surface area for clarification. Therefore to account for diameter of feed well, the diameter of clarifier is increased by 20-25%, which increases the capital cost of the unit, whereas in the improved clarifier described in the present invention, the surface area required is less, as no feed well is provided. Conventionally, the solids enter the clarifier through a high level inlet (3), get dispersed immediately and mostly settle as individual solid. Some times, therefore to increase the floc size, a flocculation mechanism is also provided (not shown). This in turn increases the size and cost of the clarifier, whereas that described in the present invention, the floc size increases due to natural flocculation, and solids settle as a zone of sludge layer uniformly.

In the conventional peripheral feed type of clarifiers, the wastewater is fed through inlet ports all along the perimeter or through spiral roll pattern by introducing the flow into the clarifier near the bottom, wherein the flow pattern induced may carry away the solids accumulated at the bottom along with the incoming wastewater, thereby resulting in higher SS concentrations in the treated effluent. Further, the peripheral feed clarifiers with open ports or orifices have inherent problem of unequal distribution as flow changes, whereas in the improved clarifier described in the present invention, the flow is uniformly distributed, ensuring uniform thickening of sludge layer at the bottom of the clarifier.

Reference may be made to U.S. Pat. No. 4,005,019 (1977) wherein the disclosure relates to rectangular clarifiers for use in the gravity separation of suspended solids from liquids. The invention basically relates to the apparatus used in the gravity separation of suspended solids from liquids, comprising a gantry supported for movement above the liquid surface; gantry drive to cause the gantry to perform repeated passes over the said liquid surface; a sludge conveyor device to move sludge which has settled at the bottom of the clarifier. The gravitational separator described in the above-referred US patent clearly indicates that the invention is related to sludge removal mechanism for rectangular clarifiers and does not include measures like hydraulic energy dissipation and improved geometrical configuration to improve solid-liquid separation described in the present invention.

Reference may be made to U.S. Pat. No. 4,761,239 (1988), wherein the process for wastewater purification is disclosed, which is particularly suitable for raw wastewater clarification by reducing BOD and SS concentrations employing sequential addition of chemicals, viz. salts of aluminium, iron or copper or composition thereof, followed by addition of flyash upstream of primary clarifier and downstream of salt feed to increase the dry solids content of the influent raw wastewater by 10-50%, and then finally adding water soluble, surface active, branched polyether amine compound having specific gravity of 1.08, to the raw wastewater, upstream of the primary clarifier and downstream of the feed point of fly ash, in an amount sufficient to increase the settling rate of sludge forming material, and clarify the effluent water at the top of primary clarifier.

In the above process, the clarification is mainly achieved by sequential addition of chemicals, polymers and fly ash rather than the gravity clarification occurring in the clarifier itself. External addition of solids in the raw wastewater not only increases the size of clarifiers to accommodate increased sludge blanket, but also requires large sludge dewatering facilities. Further, the management of solids handling and disposal becomes tedious and means additional recurring cost due to increase in quantity of sludge generated, whereas the clarifier described in the present invention, can be used for primary clarification of raw wastewater without addition of fly ash.

Reference may be made to U.S. Pat. No. 5,306,422 (1994), which discloses a compact clarifier system for municipal wastewater treatment. The clarifier system is in general based on the principles of dissolved air floatation (DAF), wherein compressed air is released at the bottom of the tank in the form of microscopic bubbles that attach to the suspended solids, the bubbles carry the solids to the surface, where they form floating sludge. The method disclosed in the above-referred patent is energy intensive and requires highly skilled supervision as compared to method described in the present invention. The solids-liquid separation described in the present invention is based on the principle of gravitation, wherein solids and liquid are separated under quiescent condition, due to difference in specific gravity.

Reference may be made to U.S. Pat. No. 5,961,826 (1999) wherein a biological wastewater treatment system having a sedimentation tank vertically combined with an aeration tank has been disclosed. The inventors claim a sedimentation tank vertically combined with an upside aeration tank and connected with the said aeration tank through a through-hole, the sedimentation tank having a clarified water outlet for discharge of clarified water from the sedimentation tank. This system is only suitable for small-scale treatment plants, since such an installation is not feasible for large-scale wastewater treatment systems. Further, the treatment system described in the U.S. Pat. No. 5,961,826 does not claim any improvement in solids-liquid separation described in the present invention.

Reference may be made to U.S. Pat. No. 6,099,743 (2000) wherein a method and basin for sedimentation of solids in wastewater treatment has been disclosed. The method of removing solids from wastewater by flocculation comprises of forcing a flow of sludge containing wastewater to abruptly change direction a number of times in succession to form whirls that create an optimum velocity for formation of sludge flocs. A method and basin for sedimentation is suitable for a designed flow rate in order to obtain optimum velocity to promote flocculation; any change in the incoming flow rate will change the optimum velocity which will affect flocculation as described in the above referred invention, hence requires highly skilled supervision, whereas in the improved clarifier, the resistance to flow is offered gradually by solids itself as described in the present invention.

OBJECTS OF THE INVENTION

The main object of the present invention is to provide an improved circular secondary clarifier for wastewater treatment and an improved solids-liquid separation process thereof, which obviates the drawbacks of the hitherto known prior art as detailed above.

Another object of the present invention is to provide an improved circular secondary clarifier having reduced surface area and operating at low HRT and achieving enhanced solids-liquid separation and BOD reduction.

Still another object of the present invention is to provide an improved secondary clarifier that ensures high underflow solids concentration thereby reducing the sludge recycle rate to maintain an active biomass concentration in aeration tank.

Yet another object of the present invention is to provide an efficient sludge removal suction mechanism for recycling of thickened sludge to aeration tank. Still another object of the present invention is to provide this advantage at a substantial cost savings, capital and operational, as compared to conventional clarifier wherein sump cum pump house is essentially required.

Another and related object of the present invention is to provide an improved circular secondary clarifier capable of handling peak loads while also meeting some prescribed Standards.

SUMMARY OF THE INVENTION

The improved circular secondary clarifier of the present invention requires less surface area and low HRT, and provides efficient solids-liquid separation. The improved clarifier has better SS and BOD reduction and provides high under flow solids concentrations, as compared to conventional secondary clarifiers. The improved clarifier is even capable of treating wastewaters containing low MLSS concentration. One of the biggest advantages of improved clarifier is that it does not require a separate sump cum pump house as it removes the settled sludge using suction mechanism thereby reduces capital and recurring cost. Further, it provides natural flocculation, which is essential for agglomeration of solids, thus eliminates provision for a flocculation mechanism. Following points bring out the novelty and non-obvious inventive steps of the present invention:

Provision of a low level inlet, being enlarged to dissipate the hydraulic energy of incoming wastewater.

Formation of plume, just above the inlet and extending vertically upwards to some distance.

Plume formation is indication of natural flocculation and dissipation of hydraulic energy, which in turn indicates that quiescent condition, is prevailing in the clarifier.

The plume, comprising of dense flocs, being heavier than wastewater, settle as one unit or zone at the bottom of clarifier.

The clarifier bottom is sloped outwards (i.e. away from the centre of clarifier), which helps in accumulating more dense sludge uniformly towards the outer edge, at the bottom of clarifier.

The settled sludge is removed uniformly using a suction mechanism without disturbing the settled sludge, thereby preventing the solids to come in re-suspension.

Provision of a circular baffle wall as a precautionary measure, to prevent escape of solids, in case some air bubbles find way into the plume and burst at the top, thereby disturbing the plume. The baffle wall helps in containing the plume within its diameter under such circumstances, thereby restricts escape of solids along with the treated effluent.

In an embodiment of the present invention, a circular secondary clarifier connected through a low level inlet (13), capable of providing steady uniform flow being gradually enlarged at the outlet (14), is capable of dissipating the hydraulic energy substantially.

In yet another embodiment of the present invention, the bottom (20) having slope 1 in 10, towards the outer edge of the clarifier is provided to ensure uniform distribution of sludge.

In still another embodiment of the present invention a sludge removal mechanism comprising non return valve (21A), vertical rod (21B) connecting the suction manifold tubes (21) and the platform (24), sludge scrapper (21C), suction pump (22), rotor gear arrangement (23), sludge rotation fixture (29) connected to sludge outlet (30) is provided to ensure complete removal of sludge.

BRIEF DESCRIPTION OF THE ACCOMPANYING DRAWINGS

FIG. 1 shows the flow pattern (11) in conventional clarifier, wherein the influent wastewater containing MLSS flows from top (at the center of clarifier) to bottom (at the middle portion of clarifier) and then move upward towards the outer portion of the clarifier to the launder. Under these circumstances, some eddy currents (12) are formed just below the baffle wall (4) and the hydraulic energy possessed by the incoming fluid is not dissipated to the extent, which can cause effective solids-liquid separation. This leads to continuous turbulence in the clarifier, which is sufficient to cause hindrance in the settling of the solids. Further, the sludge scraper mechanism (8), while rotating even at slow speed, scrapes the settled sludge (9) and brings some solids in re-suspension. Such geometrical configurations, hydraulic conditions and sludge removal mechanism altogether pose unfavourable conditions for effective solids-liquid separation thereby do not allow the treated effluent quality to meet the prescribed Standards with respect to SS and BOD.

The present invention is illustrated through FIGS. 2 to 5 of the drawings accompanying this specification. In the drawings like reference numbers indicate corresponding parts in the various Figures.

Figure 2:
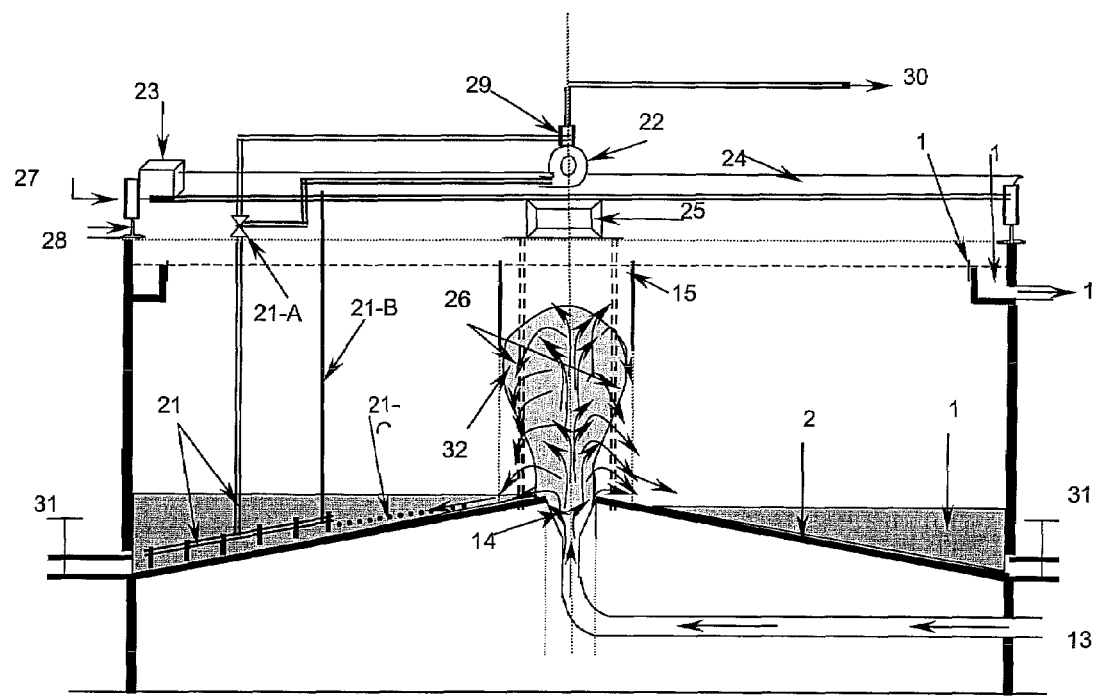

FIG. 2 represents a sectional elevation of improved circular secondary clarifier wherein the various parts and their functions are:

13—inlet for conveying wastewater containing MLSS, 14—gradually enlarged inlet for hydraulic energy dissipation, 15—baffle wall, as a precautionary measure to prevent escape of solids, 16—triangular notch, for uniform flow distribution, 17—effluent collection channel (Launder), 18—treated effluent outlet, 19—sludge blanket, 20—bottom slope 1 in 10, for uniform sludge distribution and storage, 21—suction tube manifold for sludge removal, 21-A—non return valve for sludge removal, 21-B—support rod for tube manifolds, 21-C—scraper for transporting sludge to outer edges, 22—suction pump for pumping the settled sludge, 23—rotor gear arrangement for rotating sludge removal mechanism, 24—platform for rotor and suction pump, 25—platform rotation fixture, 26—columns, to provide support for rotating bridge, 27—wheel, 28—rail section, 29—rotation fixture for electric supply and sludge line, 30—sludge outlet to aeration tank or thickening, 31—valves for dewatering, 32—sludge clouds (plume).

Figure 3:
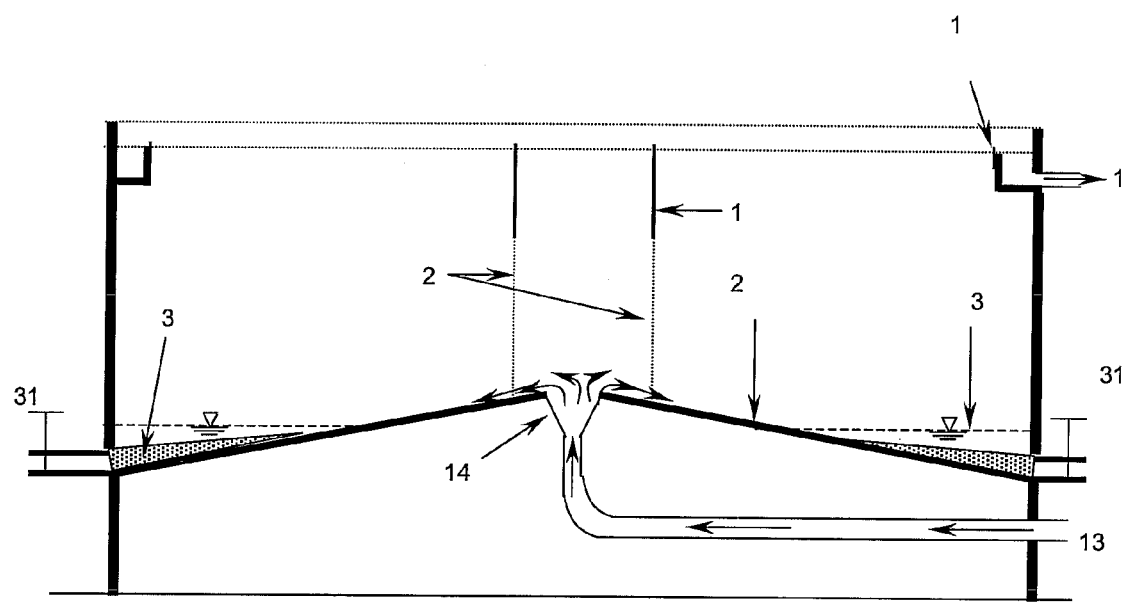
Figure 4:
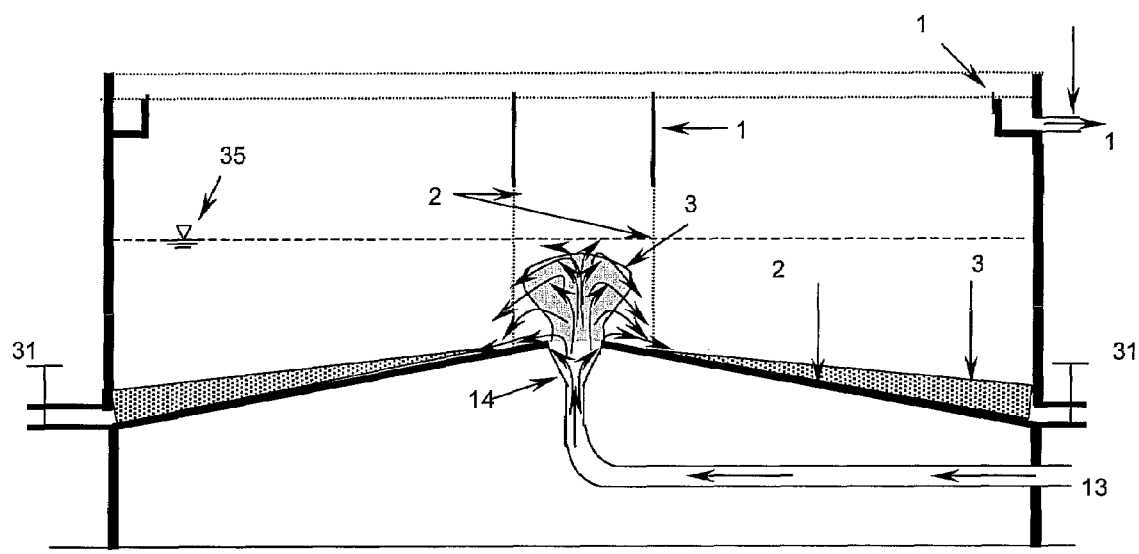
Figure 5:
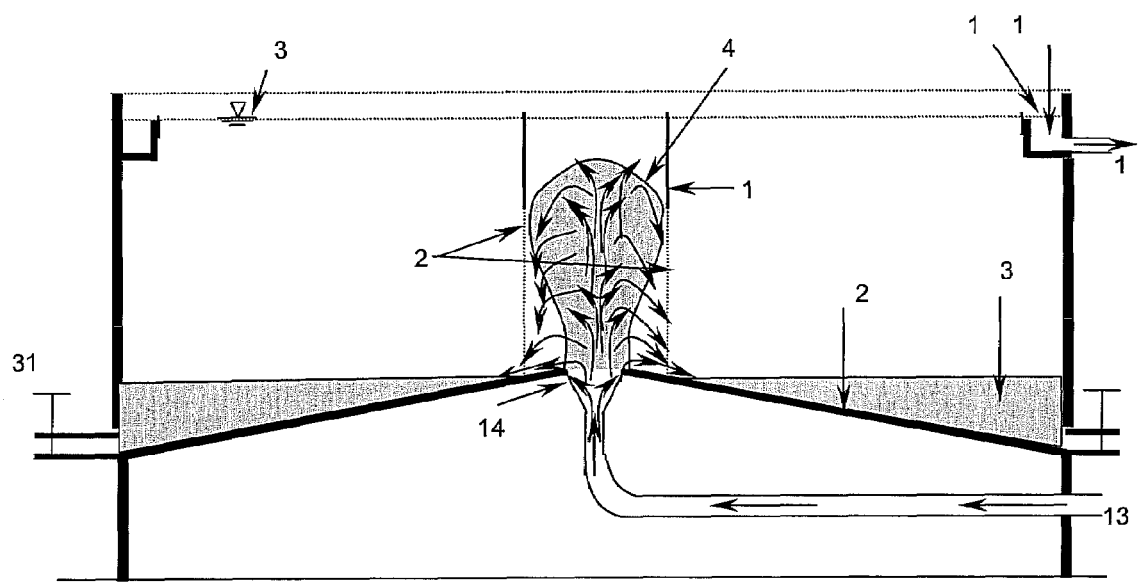

FIGS. 3, 4 and 5 represent sectional elevation of improved circular secondary clarifier showing the flow progress in FIG. 2, without sludge removal mechanism.

In FIG. 3, the various parts are:

33—initial liquid level, 34—settled solids

In FIG. 4 the various parts are:

35—liquid level after some time, 36—plume, 37—sludge blanket

In FIG. 5 the various parts:

38—maximum liquid level, 39—sludge blanket, 40—plume.

DETAILED DESCRIPTION OF THE INVENTION

Accordingly, the present invention provides an improved circular secondary clarifier for wastewater treatment and an improved solids-liquid separation process thereof wherein the wastewater containing MLSS passes through a low level inlet (13) being gradually enlarged (14), to dissipate substantial hydraulic energy of the incoming wastewater, a sludge (solids) cloud named as plume (32,36,40) is formed as a result of hydraulic energy dissipation and resistance to incoming flow offered by the bulk mass of solids thereby providing natural flocculation at the central lower portion to increase the floc size and obtaining absolute quiescent conditions in clarification zone, the plume (32,36,40) comprising high solids concentration being dense, settles quickly as one unit at the bottom (20), which is sloped outward and forms a sludge blanket (19,37,39) all along the clarifier, the settled sludge (19) is removed uniformly using suction mechanism comprising a suction pump (22) and suction tube manifolds (21), a non return valve (21-A), a sludge scraper (21-C) being connected to platform (24) through a rod (21-B) and discharged to either aeration tank (not shown) or sludge thickening (not shown) through a stationary sludge outlet (30), the platform (24) being supported on columns (26) through rotation fixture (25), at the centre and other ends of platform (24) being supported on peripheral rail section (28) through a wheel (27) and rotated through rotor gear (23), a baffle wall (15) provided as a precautionary measure to prevent escape of solids, in case some air bubbles come along with the wastewater that disturb the plume (32), two dewatering valves (31) are provided diametrically opposite to remove sludge under hydrostatic pressure, the treated effluent (18) separated from solids, the treated effluent (18) rises in the clarifier and collected uniformly in the launder (17) through triangular notches (16) thereby obtaining clarified treated effluent.

An improved circular secondary clarifier of the present invention as depicted in FIG. 2, wherein the wastewater containing MLSS, enters to clarifier through a low level inlet (13), being gradually enlarged at the outlet (14) that helps in reducing the hydraulic energy of the incoming wastewater. A baffle wall (15), is provided at the center of clarifier to contain the plume (32) within its diameter and restrict the escape of solids along with the treated effluent (18), when some air bubbles find way into the plume and burst, thereby breaking the sludge cloud or plume (32). A rotating platform (24), resting on support columns (26) at the center, through a rotation fixture (25) and supported on wheels (27), being rested on peripheral rail (28), is provided to rotate suction pump (22) and suction tube manifold (21), through a rotor gear (23). The sludge (19) settled at the bottom (20) is pumped through suction pump (22), being connected to sludge rotation fixture (29) and discharged to aeration tank (not shown) or sludge wastage (not shown) through sludge outlet (30). The treated effluent (18) is collected in launder (17) through triangular notches (16) and discharged for disposal or tertiary treatment. Two dewatering valves (31) are provided to remove sludge under hydrostatic pressure, thereby facilitating a standby option for sludge removal as well as dewatering of clarifier. The improved circular secondary clarifier of the present invention as shown in FIG. 2 is capable of treating wastewater, containing MLSS in the range 500-5000 mg/L and above with improved solids-liquid separation and BOD reduction. The improved clarifier capable of removing up to 99% of SS also ensures high under flow solids concentration (sludge), ranging from 15000-17000 mg/L. The improved clarifier requires low surface area and provides high efficiency at HRT ranging from 1.05 to 1.5 hrs. The improved circular secondary clarifier also increases particle size referred to as 'floc' through natural flocculation and does not require separate flocculation facility.

The improvement in the secondary clarifier and solids-liquid process due to non-obvious inventive steps resulting in an improved secondary clarifier for wastewater treatment has been described below:

The wastewater containing MLSS enters in clarifier through a low level inlet (13) that is gradually enlarged at the outlet (14) to distribute the wastewater uniformly all over the bottom (20). Gradual increase in pipe diameter reduces velocity of the incoming wastewater thereby reducing hydraulic energy and prevents jetting thus uniformly distributing wastewater at the bottom (20). FIG. 3 represents the flow progress in improved clarifier wherein the hydraulic energy of the incoming wastewater is substantially reduced due to gradual increase in feed pipe diameter and liquid level (33) starts increasing in the clarifier allowing the solids (34) to be accumulated at the bottom (20) towards the outer edges of clarifier. When the liquid level (35) starts rising in the clarifier as shown in FIG. 4, the solids present in wastewater collide with each other just above the gradually enlarged outlet (14), thereby undergoing natural flocculation and form bigger solids referred to as flocs.

The flocs further form a sludge cloud referred to as plume (36), which rises vertically upwards to some distance. The plume comprising of flocs, being heavier than the wastewater and after having lost substantial hydraulic energy, does not have any option, than to settle at the bottom (20) of clarifier. The plume settles as one unit, all over the bottom and is carried away towards the outer edges and forms sludge blanket (37). Initially, gradually enlarged outlet (14) dissipates the hydraulic energy of the incoming wastewater and then the bulk mass of dense solids present in the plume offers resistance to incoming flow thereby further reducing the hydraulic energy. The formation of plume (32, 36) and hydraulic energy dissipation go hand-in-hand, the plume helps in dampening the velocity of solids presents in the wastewater and the solids help in forming the plume. Formation of a well-defined plume (32, 36) indicates absolute quiescent conditions are prevailing in the clarifier, and therefore an indication of efficient solids-liquid separation. The solids are thus separated from liquid and settle uniformly and form sludge blanket (19,37) at the bottom of clarifier. The liquid separated from solids, keeps rising in the clarifier as shown in FIG. 4.

FIG. 5 shows the final stage of flow progress in FIG. 2 wherein the liquid level (38) in the clarifier rises just above the triangular notches (16) and starts overflowing uniformly and collected in the effluent collection channel (17). The sludge (39) settled at the bottom (20) is removed using suction pump (22) and suction manifold tubes (21). A plume (40) is formed at the center of clarifier and the sludge starts settling near the inlet area and then carried away towards the outer edges by the following sludge clouds or plume (40) as shown in FIG. 5. The continuous incoming flow of wastewater, containing MLSS, keeps forming sludge clouds (40), which settle as one unit and forms sludge layer. Each layer settles over the other and forms sludge blanket (39). The sludge (39) is then periodically removed, through suction pump (22) and suction tubes (21) and discharged to aeration tank or sludge thickening through sludge outlet (30).

The sludge removal mechanism as shown in FIG. 2 was specially designed and fabricated to remove the settled sludge (19). A suction pump (22) was fabricated using 12 volts (V), 10 revolutions per minute (rpm) direct current (DC) reduction motor. A piston assembly was fabricated using Plexiglas cylinder and stainless steel (SS) piston rod. The piston was made of Teflon and firmly fixed into the Plexiglas cylinder and connected to piston rod. The piston assembly was connected to DC reduction motor through a crank, made of SS. The suction pump assembly was fixed on the platform (24) spanning over the clarifier diameter and resting on the clarifier wall. The platform (24) was made of Plexiglas sheet, fixed between aluminum rods and connected to wheels (27), which rested on clarifier wall through rails (28). The wheels (27) were made of high density rubber bushes and rail (28) was made of stainless steel. The other end of piston assembly was connected to a non return valve (NRV) (21-A). The NRV (21-A) was made of glass tube in which a glass bead was kept to allow the suction of sludge in first stroke and to deliver the sludge by closing the valve in the second stroke. The outlet of NRV (21-A) was connected to a sludge rotation fixture (29), which allows the complete assembly to rotate and keeps sludge delivery stationary. The inlet of NRV (21-A) was connected to suction manifolds (21). The suction manifold (21) was made of glass tube spanning over lower half of the taper bottom (20) and connected to platform (24) through a vertical aluminum rod (21-B). A sludge scraper (21-C) made of neoprene sheet was attached to the suction manifold (21) spanning over the remaining taper (upper half) bottom (20) to scrape the sludge (19) and transport to the outer portion of clarifier.

The entire assembly consisting of suction mechanism (21, 21-A, 21-B, 21-C), suction pump mechanism (22), connected to platform (24) was rotated through a rotor gear arrangement (23). The rotor gear arrangement was made of 12 V, 6 rpm DC reduction motor. The rotational speed of motor was reduced to 2 revolutions per hour (rph) using reduction gears. The rotor gear arrangement (23) was connected to one of the wheels (27), which drove the entire assembly. Both the (DC) motors were provided continuous electric supply through a commutator, an attachment connected with the armature of a motor, through which electrical contact is made and which ensures the current flow as direct current. The commutator was made of copper foil. A transformer was used to reduce voltage from 230 to 12 V. The 12 V direct current was converted to 12 V alternate current (AC) through a rectifier. The sludge removal mechanism was designed and fabricated to remove sludge (19) from all around the clarifier and discharging it from a stationary outlet (30).

The following example is given by way of illustration of the working of the invention in actual practice, and therefore should not be construed to limit the scope of the present invention.

EXAMPLE 1

An optimized bench scale reactor of improved circular secondary clarifier was prepared using transparent Perspex cylinder of thickness 6 mm and internal diameter 430 mm and polycarbonate flexible sheet of thickness 2 mm. The influent pipe was made of glass tube of internal diameter 4 mm and thickness 1 mm and the tube diameter was gradually enlarged to 12 mm diameter over a length of 30 mm. The bottom of reactor was made of flexible polycarbonate sheet giving a slope of 1 in 10, away from the center. The water depths in the reactor at center and edges were 15 and 18 cm, respectively. The surface area of reactor was 0.1452 m$^2$ and the volume was 24 L. The effluent collection channel called as launder was made of transparent Perspex ring and flexible polycarbonate sheet. The internal and external diameters of the ring were 432 and 460 mm respectively and the launder side wall was made of polycarbonate sheet of thickness 2 mm. A treated effluent outlet made of glass tube of internal diameter 12 mm was provided at the lower most portion of the launder to collect the treated effluent. A suction removal mechanism consisting of suction pump, rotor gear assembly, rotation fixture and suction tube manifolds was provided to remove the settled sludge from the clarifier bottom.

EXAMPLE 2

The wastewater containing MLSS enters in clarifier through a low level inlet (13) that is gradually enlarged at the outlet (14) to distribute the wastewater uniformly all over the bottom (20). Gradual increase in pipe diameter reduces velocity of the incoming wastewater thereby reducing hydraulic energy and prevents jetting thus uniformly distributing wastewater at the bottom (20). The hydraulic energy of the incoming wastewater is substantially reduced due to gradual increase in feed pipe diameter and liquid level (33) starts increasing in the clarifier allowing the solids (34) to be accumulated at the bottom (20) towards the outer edges of clarifier. When the liquid level (35) starts rising the solids present in wastewater collide with each other just above the gradually enlarged outlet (14), thereby undergoing natural flocculation and form bigger solids referred to as flocs. The flocs further form a sludge cloud referred to as plume (36), which rises vertically upwards to some distance. The plume comprising of flocs, being heavier than the wastewater and after having lost substantial hydraulic energy, does not have any option, than to settle at the bottom (20) of clarifier. The plume settles as one unit, all over the bottom and is carried away towards the outer edges and forms sludge blanket (37). The liquid separated from solids, keeps rising in the clarifier just above the weir crest (20) and starts overflowing uniformly and collected in the effluent collection channel (17). The sludge (39) settled at the bottom (20) is removed using suction pump (22) at 4 litres per hour and suction manifold tubes (21), 21-A— Non return valve for sludge removal, 21-B—Support rod for tube manifolds, 21-C—Scraper for transporting sludge to outer edges, 22—suction pump for pumping the settled sludge, 23—rotor gear arrangement for rotating sludge removal mechanism, 24—platform for rotor and suction pump, 25—platform rotation fixture, 26—columns, to provide support for rotating bridge, 27—wheel, 28—rail section, 29—rotation fixture for electric supply and sludge line, 30—sludge outlet to aeration tank or thickening, 31—valves for dewatering, 32—sludge clouds (plume). and discharged to aeration tank or sludge thickening through sludge outlet (30), suction pump being rested on a rotating platform (24) which rotates at the rate of 2 revolution per hour.

EXAMPLE 3

The reactor was subjected to various solids concentrations 500-5000 mg/L, and flow rates giving variable HRT ranging from 1.0-1.5 hrs. The various parameters, viz. effluent SS and BOD, Return activated sludge (RAS) concentration, SS profile and particle size analysis at various depths along the radius of the clarifier were carried out to arrive at the optimized performance of the secondary clarifier. Table 1 shows the performance of an improved bench scale secondary clarifier and Table 2 presents a comparison of an improved and conventional secondary clarifier after scale up. The effluent parameters with respect to SS, as shown in Table 1 are well within the prescribed Standards and the RAS concentrations are also high as compared to conventional clarifier. The effluent SS concentrations obtained from improved clarifier are less than those obtained from settling studies carried out in 1 L cylinder, which clearly indicates that the clarifier has capability of providing natural flocculation that increases the particle size, thereby ensuring rapid settling of heavier particles. An analysis of SS profile and particle size along the radius at various depths indicates that solids concentration and mean particle diameter is much higher within the plume as compared to the area outside the plume. For wastewaters, with MLVSS 3000 mg/L and average particle diameter 42 μm, the solids concentration in the plume ranges from 4500-5200 mg/L and the particle diameter varies from 85-100 μm. Increase in solids concentration and particle diameter occurs as a result of formation of plume, which in turn is formed due to collision of particles (natural flocculation) and hydraulic energy dissipation. A comparative study presented in Table 2 shows that the improved circular secondary clarifier requires less surface area and depth and hence operates at low HRT, as compared to the conventional secondary clarifier. The improved clarifier also ensures high RAS and low SS concentrations in the treated effluent under the design parameters mentioned in Table 2.

TABLE 1

Performance of Improved Circular Secondary Clarifier at various HRT and Solids Concentrations

| Sr. No. | MLSS (mg/L) | Settling in 1 L Cylinder* | | Improved Clarifier | | |
|---|---|---|---|---|---|---|
| | | SS (mg/L) | RAS (mg/L) | HRT (Hrs) | SS (mg/L) | RAS (mg/L) |
| 1. | 500 | 80 | 3460 | 1.0 | 68 | 4582 |
| | | | | 1.2 | 53 | 5210 |
| | | | | 1.5 | 46 | 6170 |
| 2. | 1000 | 78 | 4830 | 1.0 | 74 | 5210 |
| | | | | 1.2 | 70 | 5436 |
| | | | | 1.5 | 62 | 6802 |
| 3. | 1500 | 87 | 7440 | 1.0 | 80 | 7562 |
| | | | | 1.2 | 62 | 8436 |
| | | | | 1.5 | 47 | 9316 |
| 4. | 2500 | 80 | 8620 | 1.0 | 64 | 9472 |
| | | | | 1.2 | 52 | 10160 |
| | | | | 1.5 | 38 | 10602 |
| 5. | 3000 | 72 | 9018 | 1.0 | 60 | 12610 |
| | | | | 1.2 | 42 | 13090 |
| | | | | 1.5 | 28 | 13804 |
| 6. | 5000 | 88 | 10314 | 1.0 | 62 | 15010 |
| | | | | 1.2 | 58 | 16124 |
| | | | | 1.5 | 50 | 16800 |

*Samples of SS and RAS collected after 1 hr.

TABLE 2

Comparison of Improved and Conventional Secondary Clarifiers following Extended Aeration after Scale-up (Flow: 10,000 m$^3$/d and MLVSS: 3000 mg/L)

| Parameters | Improved Clarifier | Conventional Clarifier |
|---|---|---|
| SLR, Kg/m$^2$ · d | 50-150 | 24-120* |
| SOR, m$^3$/m$^2$ · d | 15-30 | 8-16* |
| Diameter, m | 20-28 | 28-39 |
| Depth, m | 3.0-5.5 | 3.5-6.0* |
| RAS, mg/L | 15000-17000 | 10000-12000 |

*Source: Wastewater Engineering, Treatment and Reuse IV edition (2003), Metcalf & Eddy Inc.

The improved circular secondary clarifier is capable of providing effective separation in wastewaters containing biological solids (MLSS), wherein the difference in densities of solids and liquid is very less. For effective solids-liquid separation, it is essential that a well-defined plume is formed, which settles as one unit. Formation of a plume is an indication of natural flocculation and prevailing of quiescent conditions in the clarification zone.

The main advantages of the present invention are:
1. An improved solids-liquid separation is obtained, thereby ensuring minimum SS concentration in the treated effluent.
2. High underflow solids concentration is obtained that minimizes pumping rate, and maintains desired active biomass concentration in aeration tank.
3. It requires less surface area and depth and operates at low HRT, thereby facilitates savings in capital cost.
4. The improved clarifier does not require a separate sump cum pump house for sludge recycling/removal, thereby saves capital and recurring costs.
5. The improved secondary clarifier provides natural flocculation and does not require separate flocculation facility, thereby reduces capital and recurring cost.

The invention claimed is:

1. A circular secondary clarifier for wastewater treatment, which comprises
   (a) a circular confinement wall,
   (b) a circular bottom wall sloping outwardly and downwardly from a center thereof and joined at outer edges thereof with lower portions of said confinement wall to form a containment vessel,
   (c) a low level wastewater inlet duct positioned below said bottom wall and having an upwardly opening outlet at the center of, and substantially at the level of said bottom wall for the discharge of wastewater upwardly into said containment vessel,
   (d) a confinement baffle structure positioned centrally in upper portions of said vessel, spaced above said sloping bottom wall and said outlet,
   (e) said baffle structure being positioned in alignment with a flow of wastewater discharged from said outlet and being operative to substantially confine a plume of solids formed in upwardly flowing liquid discharged from said outlet, whereby said solids are caused to settle downward toward said bottom wall,
   (f) a rotatable scraper positioned in close relation to central portions of said bottom wall and operative to distribute solids on said central portions radially outward on said bottom wall,
   (g) a suction manifold positioned over radially outer portions of said bottom wall,
   (h) said suction manifold being associated with said scraper and being rotatable therewith over said bottom wall,
   (i) a suction pump connected to said suction manifold through a non-return valve and operative to withdraw settled sludge resting on said bottom wall from said containment vessel,
   (j) a support structure positioned at an upper portion of said containment vessel and connected to and supporting said scraper and said suction manifold, and
   (k) a drive motor for controllably rotating said support structure and thereby said scraper and said suction manifold.

2. A circular secondary clarifier according to claim 1, characterized by said low level inlet duct, being gradually enlarged at the outlet thereof to substantially dissipate the hydraulic energy of inflowing wastewater.

3. A circular secondary clarifier according to claim 1, characterized by the bottom slope of 1 in 10, towards outer edge portions.

4. A circular secondary clarifier according to claim 1, characterized by said baffle structure being of cylindrical form and of size to prevent escape of solids and to contain the plume within its diameter.

5. A circular secondary clarifier according to claim 1, further including a platform, a rotation fixture supporting a central portion of said platform, a circular peripheral rail extending about upper edge portions of said confinement wall, one or more support wheels mounted at outer portions of said platform and supported by said peripheral rail, a rotor gear mechanism connected to at least one of said wheels to rotate said platform, said suction manifold and scraper being secured by a rod structure to said platform.

* * * * *